US011068089B1

(12) United States Patent  
Kim et al.

(10) Patent No.: US 11,068,089 B1  
(45) Date of Patent: Jul. 20, 2021

(54) ELECTRONIC DEVICE WITH DISPLAY APERTURES

(71) Applicant: Apple Inc., Cupertino, CA (US)

(72) Inventors: KiBeom Kim, Cupertino, CA (US); Cheng Chen, San Jose, CA (US); Meng-Huan Ho, San Jose, CA (US); Rui Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 15/675,566

(22) Filed: Aug. 11, 2017

Related U.S. Application Data

(60) Provisional application No. 62/378,440, filed on Aug. 23, 2016.

(51) Int. Cl.
　　*G06F 3/041*　　(2006.01)
　　*G06F 21/32*　　(2013.01)
　　*G06K 9/00*　　(2006.01)

(52) U.S. Cl.
　　CPC ............ *G06F 3/0412* (2013.01); *G06F 21/32* (2013.01); *G06K 9/0002* (2013.01); *G06F 2203/0338* (2013.01)

(58) Field of Classification Search
　　CPC .............. G06F 3/0412; G06F 21/32; G06F 2203/0338; G06K 9/0002
　　See application file for complete search history.

(56) References Cited

U.S. PATENT DOCUMENTS

| 5,654,811 | A | 8/1997 | Spitzer et al. |
| 7,872,722 | B2 | 1/2011 | Kimura |
| 2012/0106063 | A1* | 5/2012 | Mathew ............ G02F 1/133528 361/679.21 |
| 2015/0295014 | A1* | 10/2015 | Lee .................. H01L 27/3246 257/40 |
| 2016/0049612 | A1* | 2/2016 | Kim .................. H01L 51/5268 257/88 |
| 2016/0202403 | A1 | 7/2016 | Mathew et al. |
| 2016/0266450 | A1 | 9/2016 | Kim |
| 2017/0062721 | A1* | 3/2017 | Kwon ................ H01L 51/0016 |
| 2017/0242172 | A1 | 8/2017 | Kerzabi et al. |
| 2017/0287992 | A1* | 10/2017 | Kwak .................. G06F 3/041 |
| 2018/0175125 | A1* | 6/2018 | Chung .................. G06K 9/0004 |

OTHER PUBLICATIONS

Kim et al., Low-Power Flexible Organic Light-Emitting Diode Display Device, Birck and NCN Publications, Aug. 2011, 8 pages.

* cited by examiner

*Primary Examiner* — Lisa S Landis
(74) *Attorney, Agent, or Firm* — Treyz Law Group, P.C.; G. Victor Treyz; David K. Cole

(57) ABSTRACT

An electronic device may have a display such as an organic light-emitting diode display. The display may have an active area formed from an array of pixels with light-emitting diodes. The light-emitting diodes may be formed from an organic layer containing emissive material between an anode layer and a cathode layer. Apertures may be formed in the active area of the display. The apertures may allow light to pass to light-sensitive components under the display. A polarizer may overlap the display and may have a bleached area that forms part of a camera aperture. Light may pass through the camera aperture to a camera under the display. The display may have an array of apertures that allow light to pass to a light-sensitive fingerprint sensor under the display.

19 Claims, 6 Drawing Sheets

ELECTRONIC DEVICE WITH DISPLAY APERTURES

This application claims the benefit of provisional patent application 62/378,440, filed on Aug. 23, 2016, which is hereby incorporated by reference herein in its entirety.

BACKGROUND

This relates generally to electronic devices and, more particularly, to electronic devices with displays.

Electronic devices often include displays. For example, devices such as cellular telephones, tablet computers, laptop computers, wristwatch devices, and other devices may have displays.

It can be challenging to incorporate components such as fingerprint sensors, cameras, and other components into an electronic device with a display. These components may be located within inactive border regions of a display, but enlarging the widths of the border regions to accommodate the components can make a device bulky and unsightly.

SUMMARY

An electronic device may have a display such as an organic light-emitting diode display. The display may have an active area formed from an array of pixels with light-emitting diodes. The light-emitting diodes may be formed from an organic layer containing emissive material located between an anode layer and a cathode layer. Apertures may be formed in the active area of the display. The apertures may allow light to pass to light-sensitive components under the display.

A polarizer may overlap the display and may have a transparent bleached area that forms part of a camera aperture. Light may pass through the camera aperture to a camera under the display. The cathode layer and the organic layer may be omitted from the camera aperture to enhance light transmission. A thin-film encapsulation layer may have a portion that overlaps the camera aperture.

The display may have an array of apertures that allow light to pass to a light-sensitive fingerprint sensor under the display. A thin-film encapsulation layer may overlap the array of apertures. A lift-off patterned opaque layer may have openings that form portions of the apertures in the array of apertures. Portions of thin-film layers in the display may be removed from the apertures to enhance transmission. These thin-film layers may include the cathode layer, which may be patterned to form an array of cathode layer openings for the apertures and the organic layer, which may be patterned to form an array of organic layer openings for the apertures.

DETAILED DESCRIPTION

Figure 1:
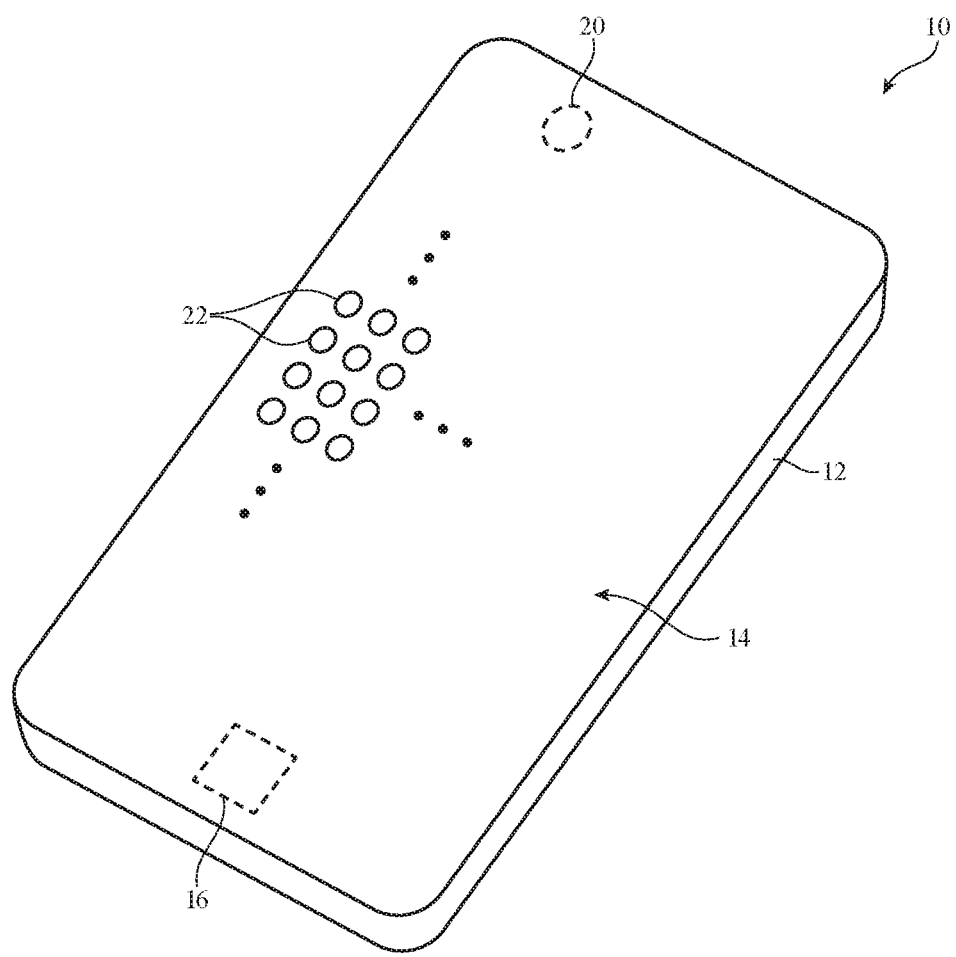
FIG. 1 is a perspective view of an illustrative electronic device in accordance with an embodiment.

An electronic device such as electronic device 10 of FIG. 1 may have a display with apertures. The apertures may allow light to pass through the display for use by components mounted behind (under) the display. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

Device 10 may include a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 22. Pixels 22 may be arranged in rows and columns in an array that covers most or all of the front face of device 10 (as an example). The array of pixels 22 in device 10 may display images for a user and may therefore sometimes be referred to the active area of display 14. The active area of display 14 may have a rectangular shape or other suitable shape and may, if desired, be bordered along one or more edges by an inactive border region (e.g., a portion of display 14 that is free of pixels 22 and that does not emit light).

It may be desirable to maximize the lateral extent of the active area of display 14 while minimizing the size of any inactive border areas. In this type of configuration, it may be desirable to mount components under display 14 that can operate through display 14. For example, a light-sensitive fingerprint sensor or other light-sensitive component may be mounted in region 16 within the active area of display 14. During operation, light from pixels 22 or other light source can illuminate a user's fingerprint associated with a finger placed on region 16. The fingerprint sensor can use an array of light sensors that are each located under a respective aperture in an array of fingerprint sensor apertures in region 16 to capture a user's fingerprint. As another example, region 20 in the active area of display 14 may be provided with a camera aperture. Light associated with external objects can be gathered and images captured using a camera (image sensor) mounted under the camera aperture.

Figure 2:
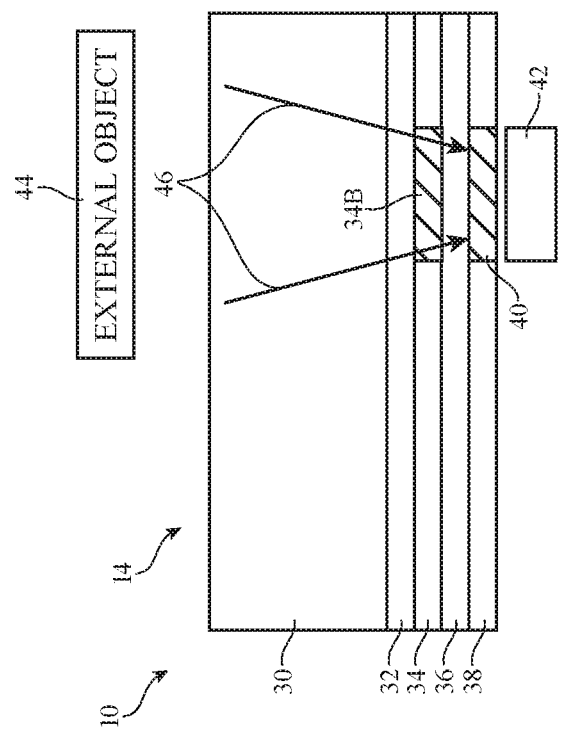
FIG. 2 is a cross-sectional side view of an illustrative display with an aperture to accommodate a camera in accordance with an embodiment.

FIG. 2 is a diagram of device 10 in an illustrative configuration in which display 14 has an aperture to accommodate a light-sensitive component such as a camera. As shown in FIG. 2, device 14 may be covered with a protective display cover layer such as display cover layer 30. Display cover layer 30 may be formed from a transparent material such as clear plastic, glass, sapphire or other transparent crystalline material, or other transparent covering material.

Cover layer 30 may cover and protect pixel array 38. Pixel array 38, which may sometimes be referred to as a display, display module, or pixel array layer, may include an array of pixels for displaying images for a user of device 10. Pixel array 38 may be, for example, an organic light-emitting diode display.

One or more functional layers such as polarizer and touch sensor layer 34 may be interposed between cover layer 30 and pixel array 38. Layer 34 may include a polarizer such as a circular polarizer to reduce reflections from pixel array 38 and may include an array of capacitive touch sensor electrodes (e.g., indium tin oxide electrodes, etc.) to form a touch sensor for display 14 (e.g., so that display 14 is touch sensitive). Adhesive layer 32 (e.g., a layer of optically clear adhesive) may be used to attach layer 34 to layer 30. Adhesive layer 36 (e.g., a layer of optically clear adhesive) may be used to attach layer 36 to pixel array 38.

A light-transparent aperture may be formed in pixel array 38 such as aperture (opening) 40. Aperture 40 may be sufficiently free of metal traces, thin-film transistors, and/or other light blocking structures to allow light 46 from external object 44 to be captured by light-based component 42 (e.g., a camera). Polarizer layer 34 may have a bleached polarizer area or a removed area such as area 34B that is transparent (e.g., has a light transmission of 80% or more, 90% or more, or other suitable amount) and therefore allows light 46 to pass through layer 34. Transparent bleached 34B may form a part of aperture 40. If desired, other structures in display (e.g., opaque thin-film layers) may be patterned to form openings for aperture 40 (e.g., a camera opening).

Figure 3:
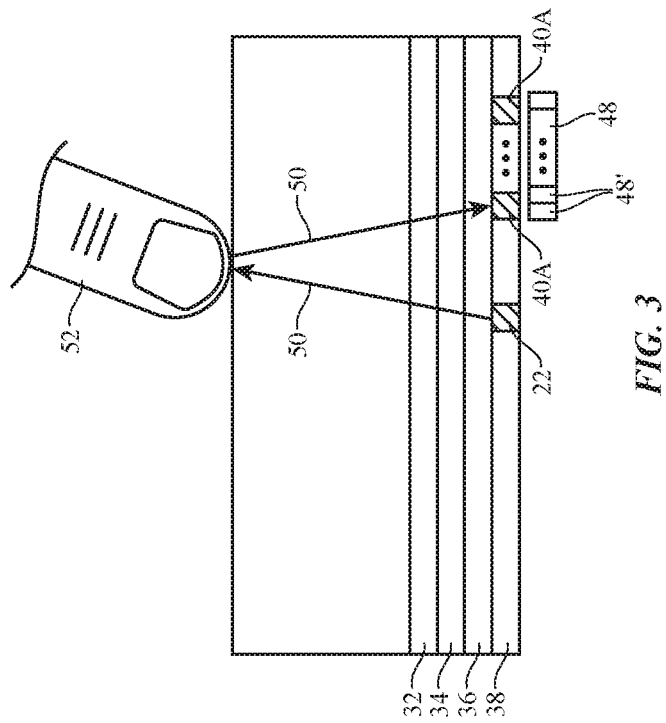
FIG. 3 is a cross-sectional side view of an illustrative display with an array of apertures to accommodate a fingerprint sensor in accordance with an embodiment.

FIG. 3 is a diagram of device 10 in an illustrative configuration in which display 14 has an array of apertures (openings) such as aperture 40A to accommodate a light-based component with an array of light sensors 48' (e.g., photodiodes or other photodetectors) such as component 48. Component 48 may be, for example, a light-based fingerprint sensor that gathers reflected light 50 from the fingerprint of a user's finger 52. Light 50 may be generated by pixels 22 in pixel array 38 or other light sources.

Figure 4:
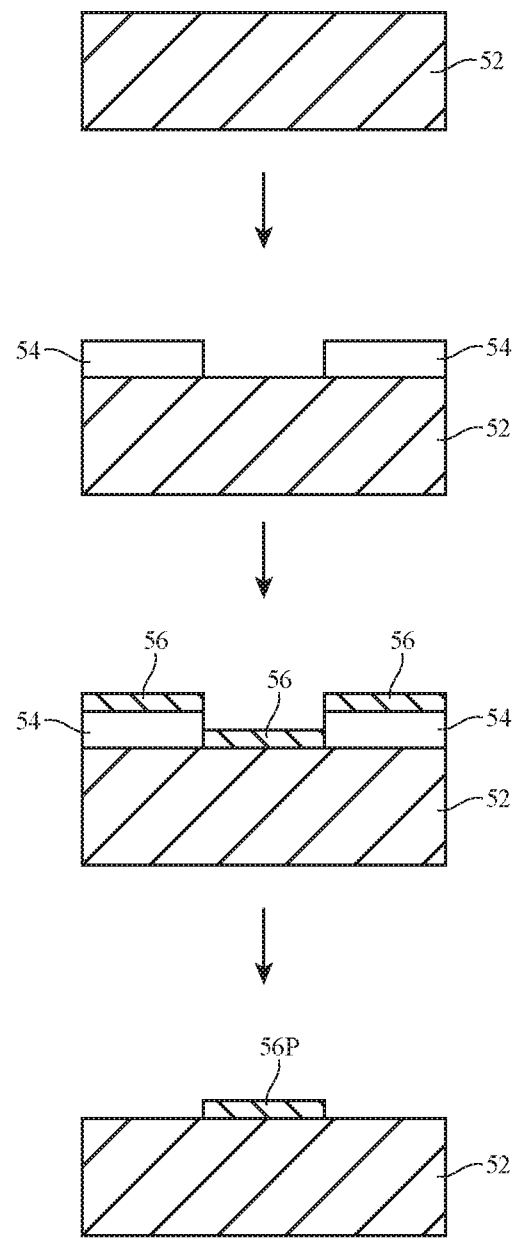
FIG. 4 is a diagram showing how display structures may be patterned using a lift-off technique in accordance with an embodiment.

It may be desirable to use fabrication techniques such as lift-off techniques to fabricate portions of display 14. A lift-off process is illustrated in FIG. 4. Initially, a substrate such as substrate 52 is provided. Substrate 52 may be, for example, one or more layers in pixel array 38. As shown in FIG. 4, substrate 52 may be covered with a photolithographically patterned layer of photoresist such as photoresist 54. Metal, polymer, inorganic dielectric, or other material may be deposited in a layer on photoresist 54, as shown by layer 56. Layer 56 may be patterned by removing photoresist layer 54 using a solvent that removes photoresist layer 54 without significantly removing any of layer 56. This leaves patterned portion 56P of layer 56 on substrate 52 as desired.

As described in connection with FIG. 2, display 14 may have an aperture such as aperture 40 in the active area of display 14 that allows light to pass to camera 42 or other light sensing component (e.g., an ambient light sensor, proximity sensor, etc.). As shown in IG. 5, display 14 may have a substrate formed from one or more supporting layers such as polyethylene terephthalate layer 90 and polyimide layer 88 or other suitable polymer layers (as an example). Thin-film layers 74 may be patterned using photolithography and other techniques on substrate layers 88 and 90 and may be used to form light-emitting diodes such as light-emitting diode 96 and associated thin-film transistors and other components for pixel circuits (e.g., pixel control circuitry including thin-film transistors such as transistor 22T for controlling light-emitting diode 96 in pixel 22).

Layers 74 may include dielectric layers (e.g., silicon oxide, silicon nitride, and/or other inorganic dielectric layers) such as buffer layers 86 and 82, gate insulator layer 80, interlayer dielectric layers 78 and 76, and passivation layer 70. Shielding layer 84 may be formed under the transistor circuitry of pixel 22 between layers 86 and 82. Active layer material 92 (e.g., polysilicon, semiconducting-oxide material, and/or other material for forming transistors) may be formed on layer 82. Interlayer dielectric layers 78 and 76 may be formed under source-drain terminals 72. Gate metal 94 may be patterned above gate insulator layer 80.

Anode layer material 68 may contact the source-drain metal of layer 72. In light-emitting diode 96, the anode layer material may form anode 68A for light-emitting diode 96. Organic layers such as organic layer 64 (e.g., emissive layer material and other organic layers) may be formed above anode 68A and may be used in generating light as current is passed between anode 68A and an overlapping cathode layer 62, which forms cathodes in display 14 for diodes such as light-emitting diode 96.

Figure 5:
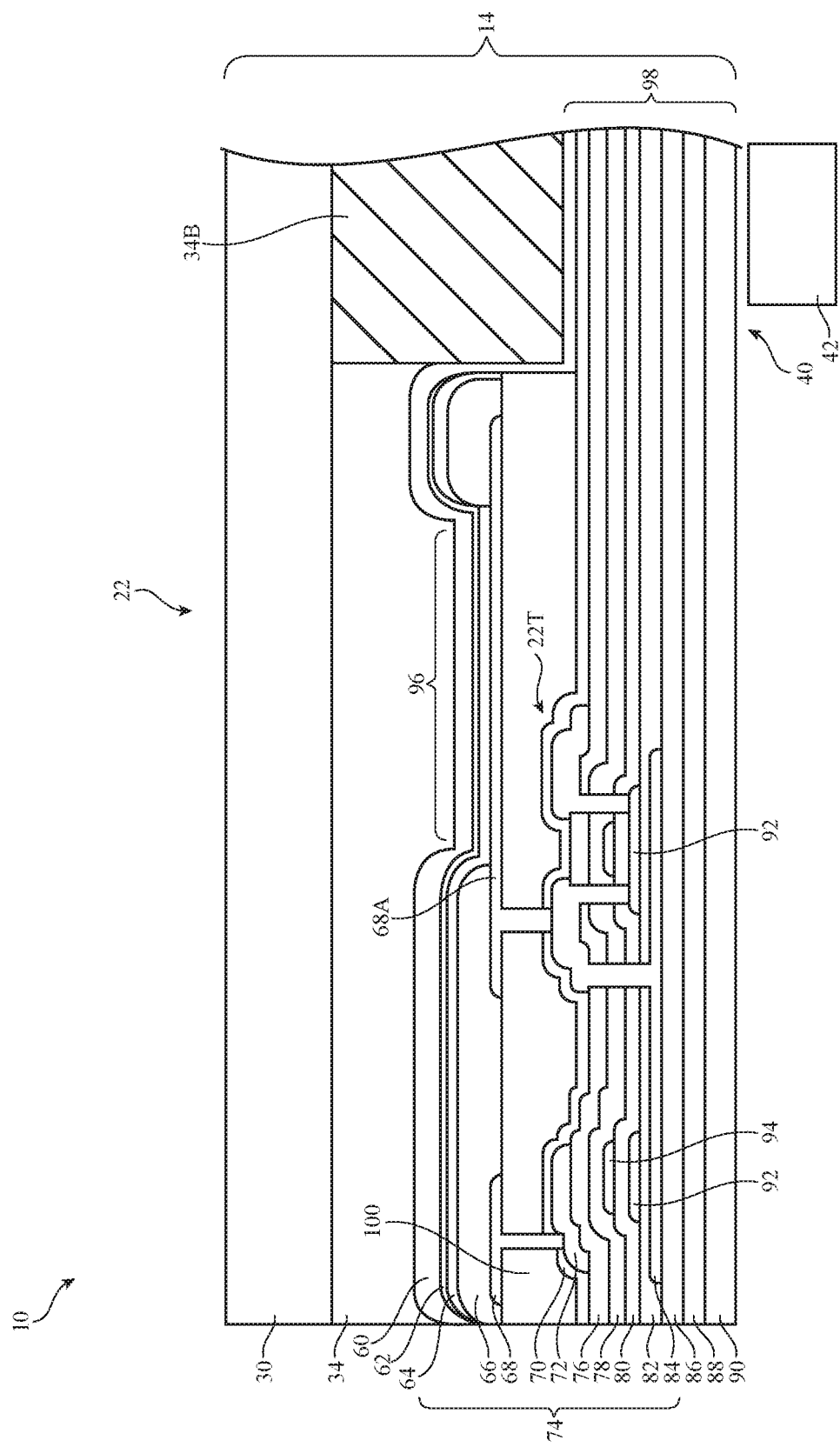
FIG. 5 is a cross-sectional side view of an illustrative display having a bleached polarizer that forms part of a display aperture to accommodate a camera in accordance with an embodiment.

Thin-film encapsulation layer 60 may be formed over cathode layer 62 to protect underlying thin-film structures from moisture. Thin-film encapsulation layer 60 may be formed from a stack of thin-film inorganic layers (e.g., silicon oxide, silicon nitride, etc.) and/or other encapsulation layer materials. Pixel definition layer 66 may be formed from a photoimageable polymer or other suitable polymer. Using photolithography, pixel definition layer 66 may be patterned to form openings for light-emitting diodes such as light-emitting diode 96 of FIG. 5.

Polarizer 34 may be interposed between display cover layer 30 and thin-film layers 74. In opening 40, polarizer 34 may be bleached to enhance transparency (e.g., to a transmission level of 90% or more or other suitable amount), as shown by bleached polarizer portion 34B. Bleached polarizer portion 34B may be formed by exposing polarizer 34 to ultraviolet light, to bleaching chemicals (e.g., KOH), or using other suitable polarizer bleaching techniques. Bleaching may be performed, for example, after polarizer lamination. If desired, the portion of polarizer 34 in portion 34B may be removed (e.g., using laser ablation, etc.). These arrangements may be used to ensure that region 34B is transparent and allows light to pass through opening 40 to camera 42 or other light-based component that are aligned with opening 40.

Thin-film layers 98 are transparent and therefore allow light to pass to camera 42 within aperture 40. Materials that may block light such as cathode layer 62, organic layer 64, anode layer 68, and other opaque thin-film layers in layers 74 may be omitted from opening 40.

Planarization layer 100 may be formed from a photoimageable polymer (e.g., polyimide, acrylic, etc.). To reduce light losses, planarization layer 100 may patterned to form an opening for aperture 40 (e.g., during the patterning of layer 100 to form vias to allow anode layer 68 to contact source-drain layer 72). By preventing planarization layer 100 from overlapping camera 42, the transparency of opening 40 may be enhanced. Transparency may also be enhanced by ensuring that substrates 90 and 88 are formed from transparent polymers or other non-opaque materials. Thin-film encapsulation layer 60 may be retained in opening 40 to help prevent lateral moisture ingress.

Figure 6:
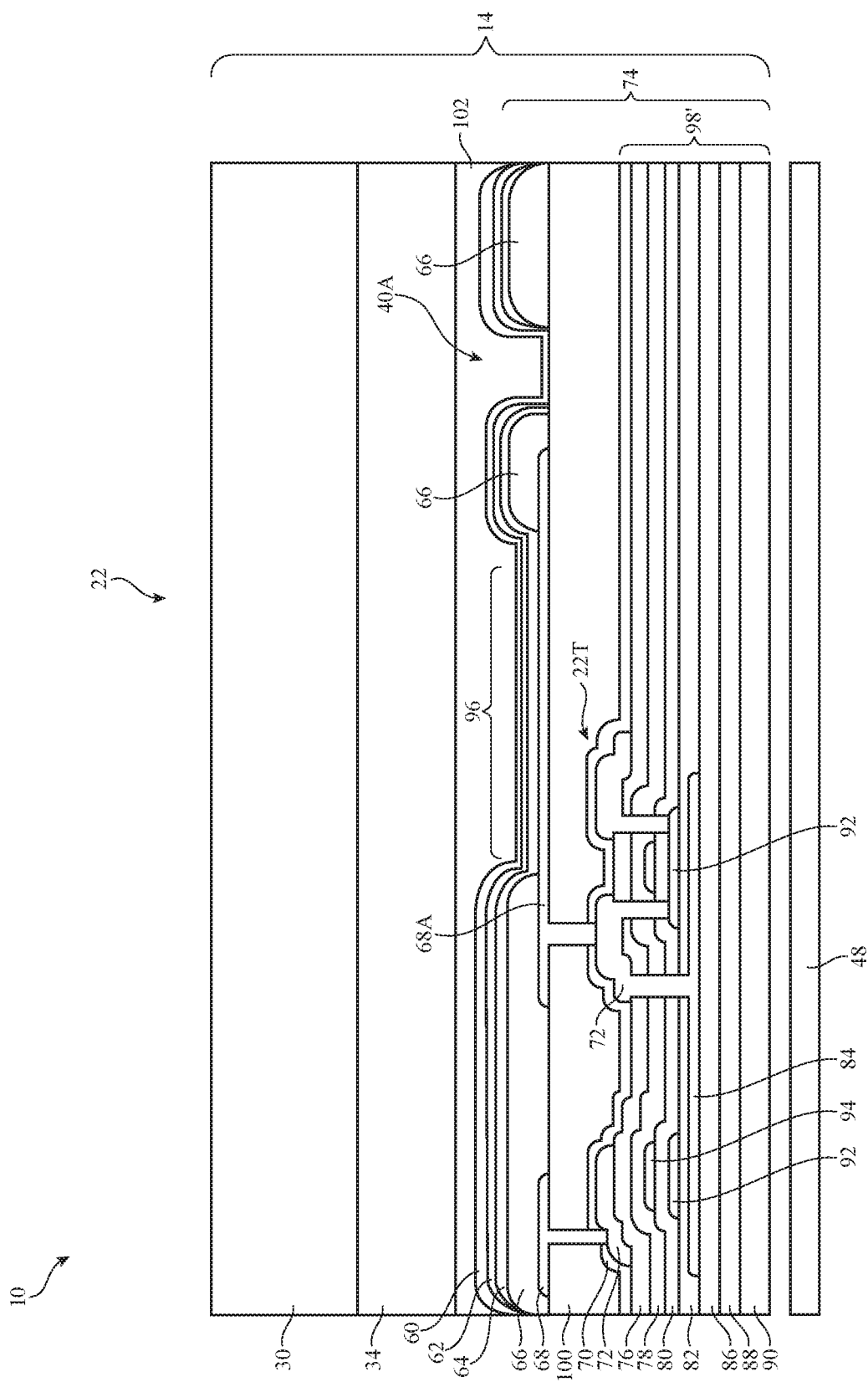
FIGS. 6 and 7 are cross-sectional side views of illustrative displays having arrays of apertures to accommodate fingerprint sensors in accordance with an embodiment.

FIG. 6 is a cross-sectional side view of display 14 in an illustrative configuration in which thin-film layers 74 have been patterned to form an array of openings such as opening 40A to accommodate an underlying fingerprint sensor or other component such as component 48. Opening 40A may include transparent layers of material such as an overlapping portion of thin-film encapsulation layer 60, an overlapping portion of polymer planarization layer 100, transparent thin-film dielectric layers 98', and substrates 88 and 90. Barrier film 102 (e.g., a thin-film layer formed from polymer and/or inorganic layers) may be transparent. Materials that may block light such as cathode layer 62, organic layer 64, anode layer 68, and other opaque thin-film layers in layers 74 may be removed from opening 40A (e.g., to form cathode layer openings in layer 64 that form parts of openings such as opening 40A, to form organic layer openings in organic layer 64 that form part of openings such as opening 40A, etc.). As a result, opening 40A may allow light from pixel 96 that has reflected from a user's finger or other external object to be sensed by sensor 48 after passing through opening 40A. Polarizer 34 may not be bleached over aperture 40A, but may be sufficiently transparent (e.g., polarizer 34 may exhibit 50% light transmission) to allow sensor 48 to operate satisfactorily.

The width of opening 40A may be about 3-7 microns or other suitable size (e.g., to make openings 40A invisible to a user and to avoid disrupting the layout of pixels 22 in pixel array 38). These dimensions are relatively small, so it may be difficult or impossible to pattern layers such as organic emissive layer 64 by depositing these layers through a shadow mask. Accordingly, layer such as layers 66 and 64 may be patterned using lift-off, as described in connection with the patterning of layer 56P of FIG. 4. Cathode layer 62 may therefore be a lift-off patterned cathode layer and organic layers 62 (including the organic emissive layer for diode 96) may be lift-off patterned organic layers.

Pixel definition layer 66 of FIG. 6 may be formed from an opaque material such as a photoimageable polymer containing black pigment (e.g., black negative photoresist). By using opaque material for pixel definition layer 66 of FIG. 6, the location and shape of each aperture 40A in the array of apertures over sensor 48 can be defined.

The opacity of pixel definition layer 66 of FIG. 6 may make it challenging to completely remove the material of layer 66 at the bottom of opening 40A during photolithographic processing (e.g., because the amount of ultraviolet light that may be applied to layer 66 during photolithography is limited due to the desire to avoid overexposing transistor 22T to ultraviolet light).

Figure 7:
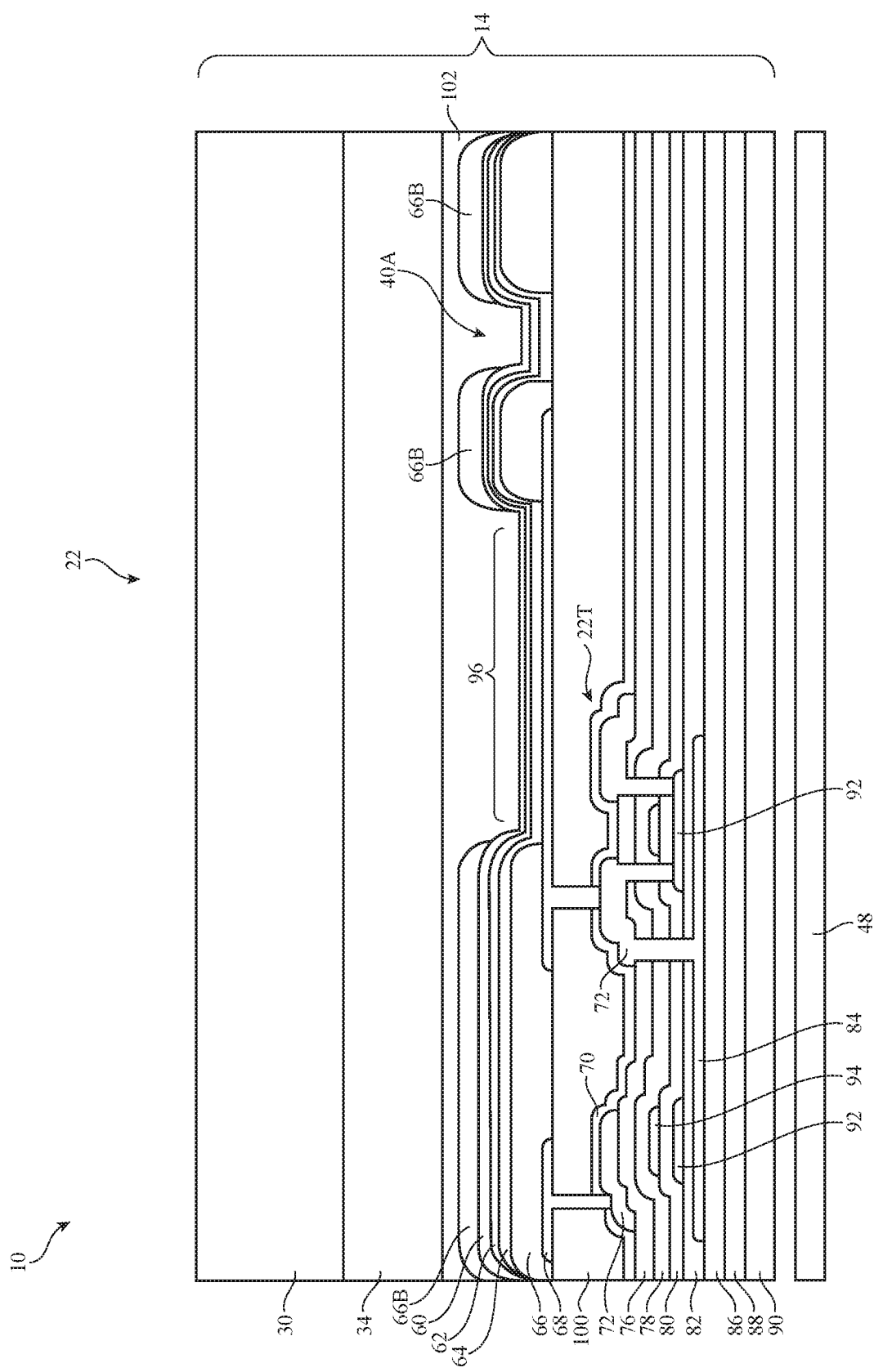

To ensure that there is no residual black pixel definition layer material at the bottom of opening 40A (which could adversely affect the performance of sensor 48), an arrangement of the type shown in FIG. 7 may be used in forming display 14. In the illustrative configuration of FIG. 7, pixel definition layer 66 has been formed from a clear photoimageable polymer that can be completely removed from the bottom of opening 40A during development.

As shown in FIG. 7, the thin-film layers of display 14 may be covered with a thin layer of opaque polymer such as layer 66B. Layer 66B may be, for example, a polymer layer that contains a sufficient quantity of black pigment to render layer 66B opaque. The opacity of layer 66B may reduce the reflectivity of display 14 (e.g., by preventing undesired reflections from cathode layer 62). By placing layer 66B on top of encapsulation layer 60, outgassing from the pigment in layer 66B may be prevented from reaching sensitive organic layer 64. Layer 66B may be sufficiently opaque to block stray light while being sufficiently thin to allow layer 66B to be patterned by lift-off. By forming layer 66B using lift-off, exposure of sensitive underlying layers such as organic layer 64 to ultraviolet light during photolithography may be avoided. Because black layer 66B is patterned by lift-off, layer 66B need not be photoimageable (i.e., layer 66B may be non-photoimagable).

The foregoing is merely illustrative and various modifications can be made to the described embodiments. The foregoing embodiments may be implemented individually or in any combination.

What is claimed is:

1. An electronic device, comprising:
   a light-sensitive component; and
   a display having:
      a substrate;
      thin-film layers on the substrate that form pixel circuits with light-emitting diodes;
      a polarizer layer on the thin-film layers, wherein the polarizer layer has a transparent bleached region that forms part of an aperture in the display through which light passes to the light-sensitive component;
      a planarization layer that overlaps the pixel circuits and that has an opening that forms part of the aperture, wherein the planarization layer has opposing first and second surfaces, the opening extends from the first surface to the second surface, and the light passes through the opening in the planarization layer; and
      a patterned photoimageable polymer layer interposed between the polarizer layer and the thin-film layers and having first openings that overlap the light-emitting diodes and second openings aligned with the aperture.

2. The electronic device defined in claim 1 wherein the light-sensitive component comprises a camera.

3. The electronic device defined in claim 2 wherein the thin-film layers include a thin-film encapsulation layer, wherein the thin-film encapsulation layer overlaps the aperture, and wherein the light passes through the thin-film encapsulation layer overlapping the aperture.

4. The electronic device defined in claim 3 wherein the thin-film layers include an organic layer containing emissive material for the light-emitting diodes and wherein the organic layer has an organic layer opening that forms part of the aperture, wherein the light passes through the organic layer opening.

5. The electronic device defined in claim 4 wherein the thin-film layers include a cathode layer, wherein the cathode layer has a cathode layer opening that forms part of the aperture, and wherein the light passes through the cathode layer opening.

6. The electronic device defined in claim 1 wherein the thin-film layers include a layer of emissive material for the light-emitting diodes and wherein the layer of emissive material does not overlap the aperture.

7. The electronic device defined in claim 1 wherein the thin-film layers include a cathode layer that forms cathodes for the light-emitting diodes and wherein the cathode layer does overlap the aperture.

8. The electronic device defined in claim 1 wherein the light-sensitive component comprises a camera, wherein the light-emitting diodes form an array of pixels for an active area of the display, wherein the aperture is formed within the active area, wherein the thin-film layers include a thin-film encapsulation layer, wherein the thin-film encapsulation layer overlaps the aperture, and wherein the light passes through the thin-film encapsulation layer overlapping the aperture.

9. The electronic device defined in claim 8 further comprising a display cover layer, wherein the display is between the light-sensitive component and the display cover layer.

10. An electronic device, comprising:
a light-sensitive component;
a display having an array of pixels that form an active area, each pixel including a respective light-emitting diode, wherein light passes to the light-sensitive component through the display and wherein the display includes:
a substrate;
thin-film layers on the substrate that include an anode layer that forms anodes for the light-emitting diodes, a cathode layer that forms cathodes for the light-emitting diodes, and an organic layer including emissive material between the anodes and the cathodes;
an array of apertures through which the light passes to the light-sensitive component, wherein the organic layer has organic layer openings that form parts of the apertures and wherein the light passes through the organic layer openings to the light-sensitive component; and
a patterned opaque photoimageable polymer layer interposed between the anode layer and the cathode layer and having first openings that overlap the light-emitting diodes and second openings aligned with the apertures.

11. The electronic device defined in claim 10 wherein the cathode layer has cathode layer openings that form parts of the apertures and wherein the light passes through the cathode layer openings to the light-sensitive component.

12. The electronic device defined in claim 11 wherein the light-sensitive component comprises a fingerprint sensor.

13. The electronic device defined in claim 10 wherein the cathode layer comprises a lift-off patterned cathode layer and wherein the light-sensitive component comprises a fingerprint sensor.

14. The electronic device defined in claim 13 wherein the light-emitting diodes are configured to emit the light that passes through the organic layer openings.

15. The electronic device defined in claim 14 wherein the lift-off patterned cathode layer has cathode layer openings that form parts of the apertures and wherein the light passes through the cathode layer openings to the fingerprint sensor.

16. The electronic device defined in claim 10 wherein the thin-film layers include a thin-film encapsulation layer that overlaps the apertures.

17. An electronic device, comprising:
a light-sensitive fingerprint sensor; and
a display having an array of pixels that form an active area, each pixel including a respective light-emitting diode, wherein light passes to the light-sensitive fingerprint sensor through the display and wherein the display includes:
a substrate;
thin-film layers on the substrate that include an anode layer that forms anodes for the light-emitting diodes, a cathode layer that forms cathodes for the light-emitting diodes, and an organic layer including emissive material between the anodes and the cathodes;
an array of apertures through which the light passes to the light-sensitive fingerprint sensor, wherein portions of the anode layer and the organic layer overlap the apertures and wherein the light passes through the portions of the anode layer and the organic layer;
a transparent photoimageable polymer layer having openings aligned with the apertures; and
a lift-off patterned opaque polymer layer having openings aligned with the anodes and having openings aligned with the apertures.

18. The display defined in claim 17 wherein the thin-film layers include a thin-film encapsulation layer that overlaps the apertures.

19. The display defined in claim 18 wherein the cathode layer overlaps the apertures.

* * * * *